US012793479B2

(12) United States Patent
Pham et al.

(10) Patent No.: US 12,793,479 B2
(45) Date of Patent: Nov. 10, 2026

(54) AUGMENTED REALITY VEHICLE DIAGNOSTIC AND REPAIR SYSTEM WITH CLOUD-BASED GUIDANCE

(71) Applicant: Innova Electronics Corporation, Irvine, CA (US)

(72) Inventors: Phuong Pham, Fountain Valley, CA (US); Keith Andreasen, Garden Grove, CA (US); Tai Anh Nguyen, Ho Chi Minh City (VN); Quan Hong Nguyen, Ho Chi Minh City (VN); Thuan Cong Huynh, Ho Chi Minh City (VN)

(73) Assignee: Innova Electronics Corporation, Irvine, CA (US)

( * ) Notice: Subject to any disclaimer, the term of this patent is extended or adjusted under 35 U.S.C. 154(b) by 14 days.

(21) Appl. No.: 18/889,142

(22) Filed: Sep. 18, 2024

(65) Prior Publication Data

US 2026/0080726 A1 Mar. 19, 2026

(51) Int. Cl.

| | |
|---|---|
| ***G07C 5/08*** | (2006.01) |
| ***G06F 3/01*** | (2006.01) |
| ***G06F 40/40*** | (2020.01) |
| ***G07C 5/00*** | (2006.01) |

(52) U.S. Cl.

CPC ............ *G07C 5/0825* (2013.01); *G06F 3/011* (2013.01); *G06F 40/40* (2020.01); *G07C 5/008* (2013.01); *G07C 5/0808* (2013.01); *G07C 2205/02* (2013.01)

(58) Field of Classification Search

CPC .. G07C 5/0825; G07C 5/008; G07C 2205/02; G07C 5/0808; G06F 3/011; G06F 40/40

USPC ........................................................ 701/33.2

See application file for complete search history.

(56) References Cited

U.S. PATENT DOCUMENTS

| | | | | |
|---|---|---|---|---|
| 9,472,028 B2 * | 10/2016 | Abdel-Rahman ...... | G06Q 10/20 |
| 11,132,850 B1 | 9/2021 | Tanada et al. | |
| 2013/0246135 A1 * | 9/2013 | Wang ...................... | G06F 17/00 701/2 |
| 2019/0370686 A1 * | 12/2019 | Pezzillo ................ | G06N 5/048 |
| 2021/0304523 A1 * | 9/2021 | Tanada .................. | G07C 5/008 |

(Continued)

*Primary Examiner* — Jelani A Smith
*Assistant Examiner* — Dana D Ivey
(74) *Attorney, Agent, or Firm* — Stetina Garred Brucker & Newboles

(57) ABSTRACT

An augmented reality (AR) vehicle diagnostic and repair system integrates onboard diagnostic (OBD) data with cloud computing to assist users in identifying and resolving vehicle issues. The system includes vehicle sensors, an OBD scanner, and a mobile device that serves as a user interface. Using AR, overlays provide real-time guidance onto the physical environment for diagnosing and repairing vehicle components. The system identifies vehicles via data from the Vehicle Communication Interface (VCI) port, including the Vehicle Identification Number (VIN). A cloud server stores detailed vehicle-specific information, including 3D models, wiring diagrams, and Diagnostic Trouble Codes (DTCs) with associated repair instructions. The system supports remote diagnostics and real-time interaction with professional mechanics. Artificial intelligence (AI) and machine learning (ML) enhance the database, ensuring accurate AR guidance tailored to each vehicle. This system simplifies complex vehicle repairs, making them more accessible to users with limited technical expertise.

20 Claims, 6 Drawing Sheets

(56) References Cited

U.S. PATENT DOCUMENTS

2022/0171641 A1* 6/2022 Pichiliani ................ H04L 51/56
2022/0289249 A1* 9/2022 Imai .................. B60W 60/0059

* cited by examiner

AUGMENTED REALITY VEHICLE DIAGNOSTIC AND REPAIR SYSTEM WITH CLOUD-BASED GUIDANCE

CROSS-REFERENCE TO RELATED APPLICATIONS

Not Applicable

STATEMENT RE FEDERALLY SPONSORED RESEARCH/DEVELOPMENT

Not Applicable

BACKGROUND

1. Technical Field

The present disclosure relates generally to vehicle diagnostics for assisted user problem intervention. The disclosure relates more particularly to an onboard diagnostic system that determines vehicle issues from onboard diagnostic information used in conjunction with a cloud server that provides an augmented reality image to assist users in learning, understanding, locating and addressing vehicle issues.

2. Description of the Related Art

The history of vehicle onboard diagnostic (OBD) systems is a story of gradual evolution from rudimentary, mechanic-focused tools to the sophisticated, user-friendly systems we see today. In the early days of vehicle electronics during the 1960s and 1970s, onboard diagnostics were minimal and largely inaccessible to vehicle owners. Basic electronic systems controlled essential functions like ignition timing and fuel injection, but these early systems offered little more than a "check engine" light to indicate a problem. For the average driver, this warning light provided no specific information about the issue, leaving them dependent on professional mechanics for diagnosis and repair.

The introduction of OBD1 in the 1980s was the first attempt to standardize onboard diagnostics, with California leading the initiative. Although OBD1 systems were a step forward, they were still quite limited. The codes they generated were basic and often cryptic, accessible only through specialized tools that were not available to the average vehicle owner. As a result, end users remained in the dark about the specific nature of their vehicle's problems, relying heavily on mechanics to interpret these codes.

The mid-1990s saw the advent of OBD2, which represented a significant leap forward in the accessibility and functionality of onboard diagnostics. For the first time, a standardized system was implemented across all vehicles sold in the United States, making it possible for any OBD2-compatible vehicle to be diagnosed using universal tools. This standardization, combined with the introduction of the OBD2 port under the dashboard, made it easier for drivers to access diagnostic information. Affordable OBD2 scanners began to enter the consumer market, allowing vehicle owners to read diagnostic trouble codes (DTCs) themselves. This shift gave drivers more control over their vehicle's maintenance, enabling them to diagnose issues without immediately resorting to a mechanic.

In the 2000s and 2010s, the widespread adoption of smartphones and the internet further extended access to vehicle diagnostics. Bluetooth-enabled OBD2 adapters allowed vehicles to connect to smartphones and tablets, where apps could read and interpret DTCs, providing explanations and even suggesting possible fixes. This technology empowered drivers to take a more hands-on approach to vehicle maintenance, often resolving minor issues on their own. These tools also introduced real-time data monitoring, helping drivers better understand their vehicle's performance and make informed decisions about maintenance.

However, as OBD systems became more accessible to the general public, they also revealed new challenges. While these tools allowed drivers to diagnose issues more independently, they often provided only limited guidance on how to interpret and act on the information. For unsophisticated users, this could lead to improper fixes or even cause damage to the vehicle. For instance, a driver might misinterpret a code or overlook the context of the problem, leading to a temporary fix that fails to address the underlying issue or, worse, exacerbates the problem. Conversely, they might underestimate a critical issue, such as an engine misfire, and delay necessary repairs, risking further damage to the engine. This limitation highlights a gap between the availability of diagnostic information and the average driver's ability to effectively use it, underscoring the need for more intuitive and comprehensive diagnostic tools.

Another common danger is that users might reset the "check engine" light after reading the codes when their actions, or inaction, fail to address the root cause. This can temporarily mask the problem, giving a false sense of security while the underlying issue worsens. For instance, if a driver clears a code related to a failing catalytic converter without understanding its significance, they could continue driving with increased emissions and reduced fuel efficiency, eventually leading to more severe damage and costly repairs. Additionally, unsophisticated users might attempt to perform repairs without the proper tools or knowledge, potentially causing further damage. For example, an inexperienced user might improperly install a new, perhaps improper, part, such as a sensor or fuel injector, leading to leaks, part failure, electrical issues, or even engine failure. In some cases, tampering with certain systems without proper understanding can also void warranties or violate regulations, resulting in additional financial and legal consequences. These examples underscore the risks of DIY vehicle repairs without sufficient knowledge and the importance of seeking professional assistance when necessary.

BRIEF SUMMARY

In accordance with an example embodiment of the present disclosure, a system improves vehicle diagnostics and repair using augmented reality (AR) technology, cloud computing, and artificial intelligence (AI). The system includes a Vehicle Communication Interface (VCI) that connects to a vehicle's onboard systems to retrieve diagnostic data. This data is sent to a cloud server, where it is processed using AI and machine learning algorithms to analyze the information and generate insights.

A mobile device, such as a smartphone or tablet, communicates with the cloud server and receives the processed data. This device is equipped with an AR module that overlays diagnostic information, repair instructions, and real-time data onto the live images of the vehicle captured by the device's camera. This AR-enhanced view allows users to see exactly what parts of the vehicle need attention and how to perform the necessary repairs.

Additionally, the system features a user interface on the mobile device that provides interactive guidance throughout the diagnostic and repair process. This interface can answer questions and offer step-by-step instructions, making it easier for users to perform complex repairs. The system also includes a chatbot integrated into the user interface. This chatbot provides real-time assistance by responding to user inquiries about diagnostic trouble codes (DTCs) and offering related repair advice, all based on the data processed on the cloud server.

BRIEF DESCRIPTION OF THE DRAWINGS

These and other features and advantages of the various embodiments disclosed herein will be better understood with respect to the following description and drawings, in which.

DETAILED DESCRIPTION

Figure 1:
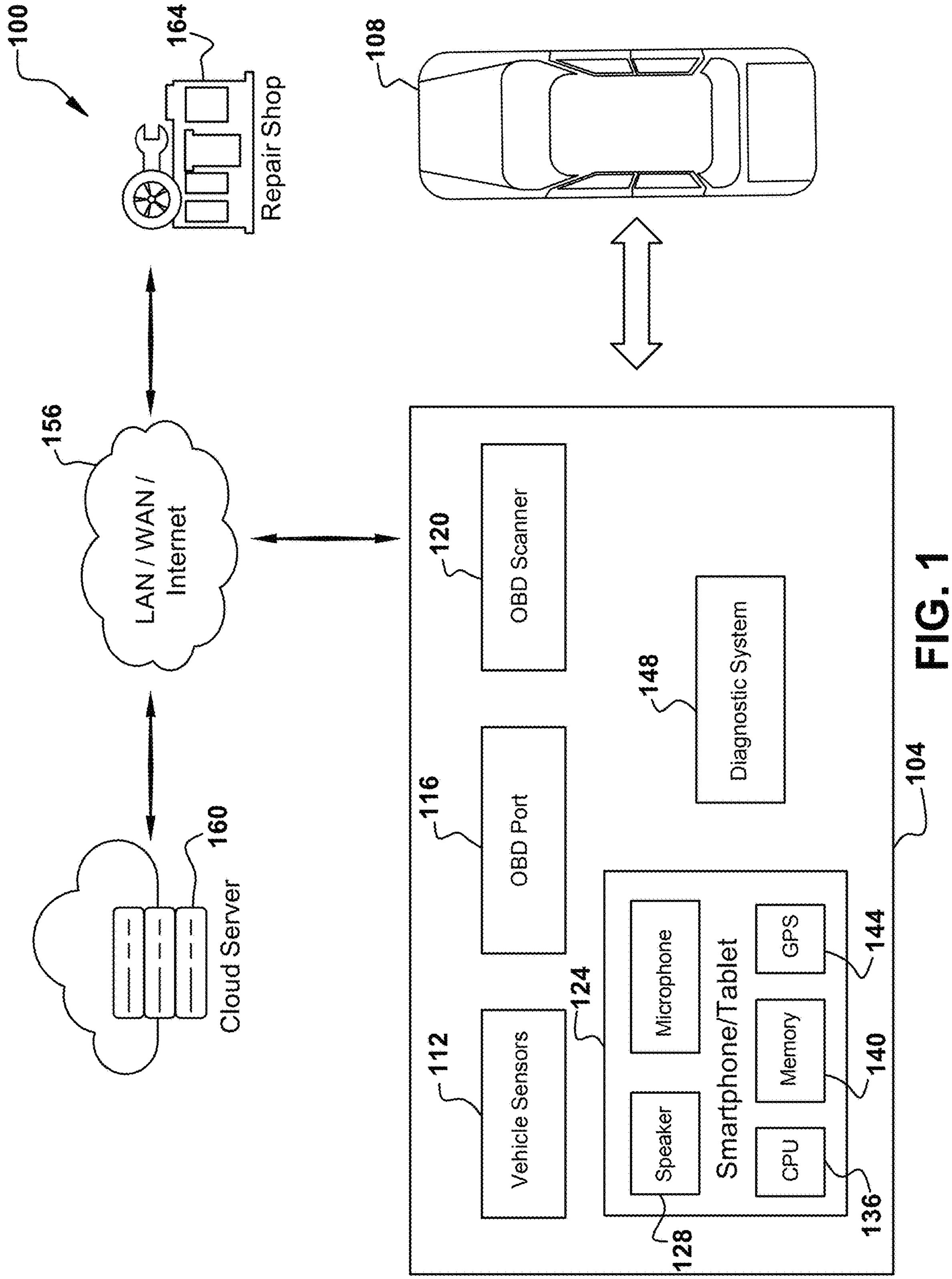
FIG. 1 illustrates an operational environment of an example embodiment of an augmented reality vehicle diagnostic and repair system.

The detailed description set forth below in connection with the appended drawings is intended as a description of certain embodiments of a vehicle diagnostic system and related method, and is not intended to represent the only forms that may be developed or utilized. The description sets forth the various structure and/or functions in connection with the illustrated embodiments, but it is to be understood, however, that the same or equivalent structure and/or functions may be accomplished by different embodiments that are also intended to be encompassed within the scope of the present disclosure. It is further understood that the use of relational terms such as first and second, and the like are used solely to distinguish one entity from another without necessarily requiring or implying any actual such relationship or order between such entities.

Example embodiments herein address problems and concerns associated with unsophisticated users attempting to address vehicle issues on their own using OBD information. This is accomplished through the implementation of augmented reality (AR). AR technology overlays digital information onto the real world, enhancing the user's perception of their environment. Unlike virtual reality, which immerses users in a completely digital space, AR blends virtual elements with physical surroundings, creating a mixed reality experience. AR can be experienced through various devices, including smartphones, tablets, and specialized AR glasses, which use cameras and sensors to map the real world and superimpose digital content onto it.

The term "augmented reality" was coined in the early 1990s by Tom Caudell, a researcher at Boeing, who used the concept to help assembly workers by overlaying virtual diagrams and instructions onto physical aircraft parts. This application demonstrated the practical potential of AR in industrial settings, showing how it could enhance human tasks by providing real-time information directly in the context of a job.

As technology advanced through the 1990s and 2000s, AR systems became more sophisticated, with researchers exploring various applications from military training to medical imaging. The development of ARToolKit in 1999, an open-source software library that simplified the creation of AR applications, made it easier for developers to experiment with the technology and create new AR experiences.

The rise of smartphones in the late 2000s and early 2010s made AR more accessible to the general public. With built-in cameras, GPS, and powerful processors, smartphones became ideal platforms for AR applications. Apps like Layar, launched in 2009, allowed users to view digital information overlaid on real-world locations through their smartphone cameras, marking AR's entry into the consumer market.

Example embodiments here facilitate the use of AR with OBD to assist end users in diagnosing, locating, and addressing vehicle issues. The system typically includes a data device, such as a smartphone or tablet that provides real-time assistance specific to their particular vehicle. AR diagnostics and repair can be applied to various areas both outside and inside a car, providing real-time guidance and information overlays to assist users with maintenance tasks. On the exterior, AR can help with tasks in the engine bay, such as identifying and repairing components like the engine, battery, and belts, as well as guiding fluid checks and replacements. It can also assist with inspecting and maintaining wheels, tires, and brakes, offering guidance on tasks like checking tire pressure or replacing brake pads. For exterior bodywork, AR can help identify and address damage like dents or scratches, guiding users through repairs or panel replacements. Additionally, AR can aid in the maintenance of lights, windows, and electrical components, providing step-by-step instructions for tasks like bulb replacement or windshield repair.

Inside the car, AR can assist with diagnosing issues on the dashboard and instrument panel, guiding users through interpreting warning lights and accessing components behind the dashboard. It can help with the repair or replacement of interior parts such as seats, trim panels, and the HVAC system, including tasks like replacing air filters or troubleshooting air conditioning issues. AR can also guide users through repairs related to the steering wheel, center console, and infotainment system, offering visual assistance for tasks like replacing controls or updating software.

Under the car, AR can help inspect and repair the exhaust system, suspension, and drivetrain, providing guidance on tasks like replacing mufflers, checking suspension components, or inspecting the transmission. By overlaying information directly onto the user's view, AR makes it easier to locate specific parts, understand repair procedures, and carry out maintenance tasks accurately and efficiently across all these areas of the vehicle.

Referring now to the drawings, FIG. 1 illustrates an operational environment 100 of an example embodiment of an augmented reality vehicle diagnostic and repair system. Included is a hardware block diagram 104 for use in conjunction with a moving vehicle such as automobile 108, suitably referred hereinafter as an OBD/AR system. Included in OBD/AR system 104 are vehicle sensors 112, OBD scanner 120, and a mobile device 124. As used herein a mobile device is suitably comprised of a smartphone, tablet, intelligent OBD dongle, or any other suitable portable data device. Mobile device 124 includes a speaker 128, microphone 132, CPU 136, memory 140 and GPS receiver 144. Also included in system 104 is diagnostic system 148. OBD/AR system 104 is in data communication with network cloud 156, suitably comprised of any wireless or wired data carrier, and may include a local area network (LAN), a wide area network (WAN), which may comprise the Internet, or any suitable combination thereof.

Also in data communication with network cloud 156 is cloud server 160, as well as repair shop 164, suitably used to supply parts or services associated with vehicle diagnosis and repair.

A noted above, it is important that a vehicle be initially identified accurately. A vehicle is suitably identified in concert with the cloud server with information obtained from the vehicle OBD port, also referred to as a Vehicle Communication Interface (VCI) port. This port provides access to the vehicle's electronic control units (ECUs), allowing diagnostic tools to retrieve a range of data that can uniquely identify the vehicle. One of the most direct methods of identification is through the retrieval of the Vehicle Identification Number (VIN). A VIN is a 17-character code that uniquely identifies a vehicle, encoding key details about its origin, manufacturer, and specifications. The first three characters form the World Manufacturer Identifier (WMI), indicating the country of origin, manufacturer, and vehicle type. The next section, the Vehicle Descriptor Section (VDS), includes characters four through nine, which provide information about the vehicle's model, body type, engine type, and a check digit to validate the VIN's accuracy. The final part, the Vehicle Identifier Section (VIS), consists of characters ten through seventeen. These characters reveal the vehicle's model year, assembly plant, and a unique serial number. In addition to these standard details, manufacturers may include specific information such as trim level, safety features, and market destination.

Thus, the VIN is a unique 17-character code that offers detailed information about the vehicle, including its manufacturer, model, year of manufacture, and other specific details. Most modern vehicles store the VIN in the ECU, and it can be accessed using an OBD2 scanner. The VIN is a crucial identifier, widely used in diagnostics, repairs, and record-keeping to ensure the correct handling of a specific vehicle.

In addition to the VIN, the ECU contains identification data that can include part numbers, software versions, and hardware IDs. This information helps in identifying not only the vehicle's make and model but also its specific configuration or version of the vehicle's systems. For example, certain software or hardware versions might be exclusive to a specific production batch or variant of a vehicle, which can be critical for accurate diagnostics and repairs. Furthermore, different vehicle manufacturers may embed additional identification codes within the vehicle's ECUs. These codes often include model-specific identifiers, engine codes, or transmission codes, which can be retrieved via the VCI port. Such codes provide further granularity in identifying the exact configuration or options package of the vehicle.

DTCs themselves can also offer insights, though they do not directly identify a vehicle. A pattern of DTCs retrieved from a vehicle can sometimes indicate the type and condition of the vehicle, with certain codes being specific to particular engine types or models. Additionally, some vehicles store odometer readings and other usage data in the ECU, accessible through the VCI port. While this data does not identify the vehicle in the same way as a VIN, it provides context that, when combined with other data, can help verify the identity of a vehicle.

The communication protocols used by the VCI port, such as ISO 9141, CAN, or J1850, can also hint at the make or model of the vehicle, as different manufacturers and models utilize specific protocols. This information is particularly useful when trying to identify a vehicle that may not be immediately recognized by the diagnostic tool. By accessing and interpreting the data available through the VCI/OBD port, it is possible to accurately identify a vehicle, including its make, model, year, and even specific configurations. This identification process is essential for diagnostics, repairs, and any system requiring vehicle-specific information, such as an AR-enhanced diagnostic system.

Cloud server 160 also stores a wide range of information that significantly aids in navigating to, identifying, and repairing or replacing vehicle parts using Diagnostic Trouble Code (DTC) information. This includes comprehensive data about the specific make, model, and year of the vehicle, such as the layout of the engine bay, wiring diagrams, and detailed descriptions of each component. Such information is crucial in helping users accurately locate and identify faulty parts.

Additionally, a database of DTCs linked to specific vehicle issues are suitably stored in the cloud, providing detailed explanations of problems, potential causes, and suggested repair actions. This allows the system to offer clear guidance on what each code means and the necessary steps to resolve the issue. The cloud also suitably hosts step-by-step repair procedures for each component associated with a DTC, including text instructions, images, and video tutorials that guide the user through diagnosing, removing, and replacing the faulty part. These instructions are tailored to the specific vehicle model, ensuring they are accurate and relevant.

Furthermore, 3D models of vehicles, vehicle parts and assemblies are suitably stored in the cloud and accessed by the user's smartphone to provide interactive, AR overlays. These overlays visually guide the user to the exact location of the component in the vehicle and demonstrate how to perform the repair or replacement. The cloud server suitably stores information on the specific tools and replacement parts needed for each repair, including part numbers, compatible aftermarket options, and links to purchase the parts online. This helps users gather the correct items before starting the repair, reducing the risk of using incorrect or inadequate tools.

In addition, the cloud server suitably stores a list of common issues and the most successful repair solutions for each DTC or component. This data helps users troubleshoot more effectively by offering insights into what has worked for others with similar problems. The cloud server also suitably stores the vehicle's maintenance and service history if linked with a user's account, allowing the system to provide personalized advice based on previous repairs, known issues, or upcoming maintenance needs. It can alert the user to potential complications or the need for additional inspections based on the vehicle's history.

Live data from the vehicle's sensors is suitably stored temporarily in the cloud for analysis, providing real-time feedback to the user during the repair process, such as confirming that a sensor is functioning correctly after replacement or that the repair has resolved the issue. Safety information relevant to the specific repair can also be stored and presented to the user before they begin work, including warnings about potential hazards and instructions on how to safely handle components and tools. The cloud further facilitates remote support by connecting users with professional mechanics or customer service representatives, allowing them to upload photos or live video feeds of their vehicle to receive real-time advice or troubleshooting tips. This wealth of information stored in the cloud transforms complex vehicle diagnostics and repairs into manageable tasks, even for those with limited technical expertise.

Accurate AR assistance requires that the cloud have a robust database of images, parts and instructions tied to specific vehicle models. This is suitably generated in conjunction with artificial intelligence (AI) and machine learning (ML). A suitable AI/ML system for cloud-based augmented reality vehicle diagnostics and repair includes several stages, starting from data collection and ending with real-time AR guidance for the end user.

Figure 2:
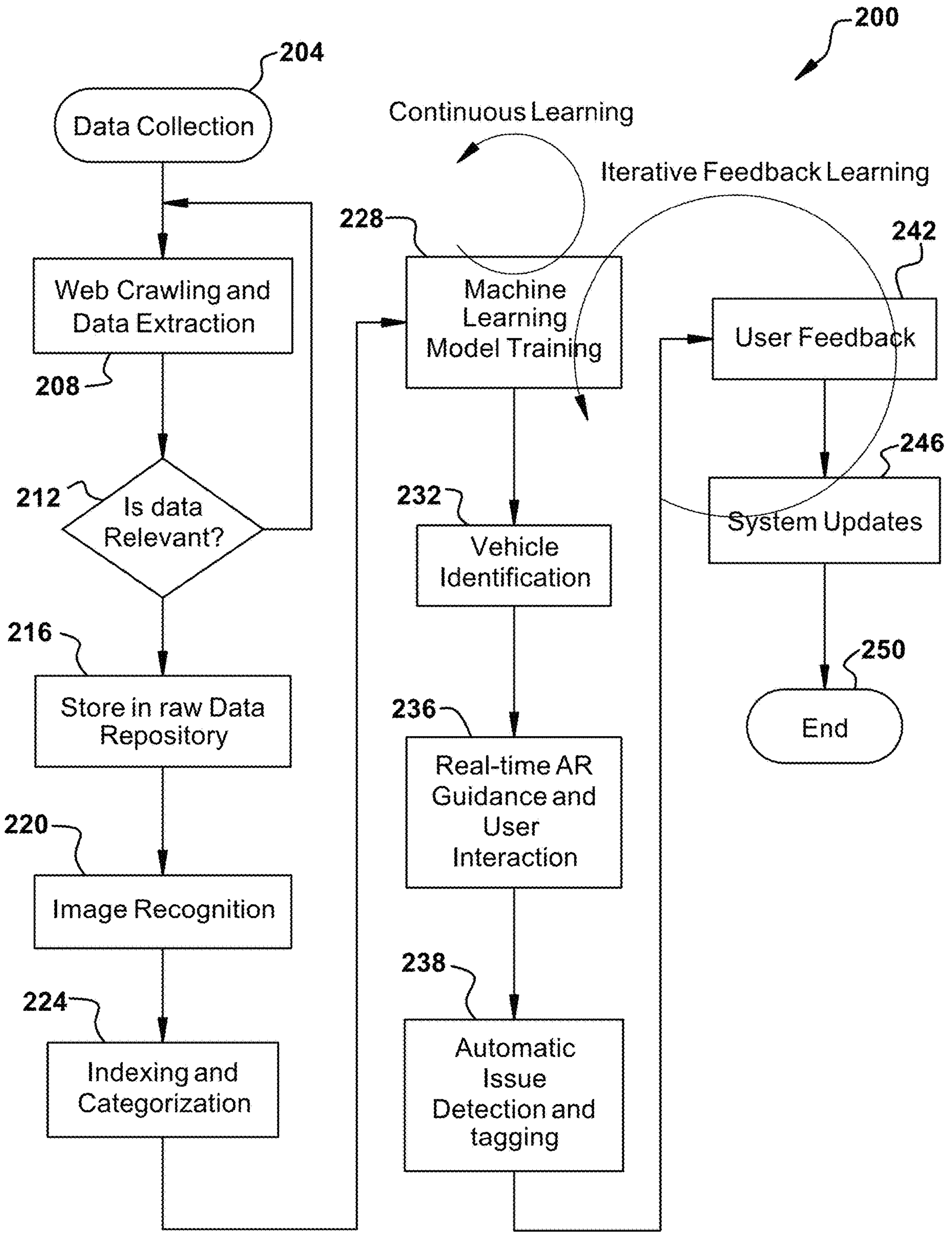
FIG. 2 illustrates a flow diagram of an example embodiment of an AI/ML system.

FIG. 2 illustrates a flow diagram 200 of an example embodiment of an AI/ML system. Additionally, the system features an automatic detection function that identifies other potential vehicle issues as the user navigates to a specific location, tagging these issues for future attention.

The system commences at block 204 with data collection. At block 208, the process begins by using web crawlers to search the internet for relevant visual data from suitable websites, such as car manufacturer websites, car part suppliers, DIY car repair forums, and platforms, such as YouTube, which often include vehicle diagnosis or vehicle repair videos specific to various makes, years and models. In order to generate AR overlays, a focus is suitably made on images, diagrams, and video content that illustrate vehicle parts, their locations, and repair procedures. The web crawlers extract this visual content, including relevant metadata, and, if determined to be relevant at block 212 store it in a raw data repository at block 216. Iterative data collection is completed by returning to block 208.

Next, image and video processing is completed. Relevant data is subjected to image recognition at block 220. The system analyzes the collected images and video frames and identifies vehicle components, part layouts, and step-by-step repair processes, categorizing and indexing this visual information in a structured database at block 224. The data is linked to specific vehicle makes, models, and components, allowing for easy retrieval during the repair process.

Next, machine learning and model training is undertaken at block 228. The system trains machine learning models using the processed visual data. These models, particularly computer vision models, are trained to recognize vehicle components in real-time images captured by the user's data device, such as their smartphone, and predict potential issues based on visual cues identified. The models are continuously updated via continuous learning with new data to improve accuracy and adapt to new vehicle models and repair techniques.

When a user connects their smartphone to receive data from the vehicle's OBD system, the app retrieves vehicle-specific data to identify the vehicle's make, model, and year at block 232. This information is cross-referenced with the visual data stored in the cloud. The user then scans their vehicle with the smartphone's camera, and the AR system overlays relevant information directly onto the camera feed. The system highlights the specific part needing attention, provides a 3D model, and displays step-by-step visual instructions for locating an area for repair or replacement.

As the user navigates to the specific vehicle location guided by the AR system, the AI/ML algorithms continuously monitor the camera feed for other potential issues. If the system detects any anomalies or signs of wear in other components, it automatically tags these issues for future attention at block 238. The tagged issues are recorded in the user's repair log, and the system may provide a notification suggesting further inspection or maintenance at a later time. This function ensures that even less obvious problems are noted and addressed before they can cause significant damage. By way of example, as a user scans for a repair location under the hood, they system may not a leaking battery or a worn belt. The system suitably generates a notice of the presence of a discovered issue on the smartphone display. For non-critical issues, it may simply be an indication to check logged information. For critical issues, an immediate notification or alarm is suitably generated.

After a repair is completed, the user can provide feedback on the accuracy and usefulness of the AR guidance at block 242. This feedback is collected and used to improve the system. The user feedback stage includes the option for users to upload images or videos of their repairs, which are analyzed and added to the training dataset. An arrow loops back from the "User Feedback" stage to earlier stages such as "Model Training" and "System Updates," illustrating the continuous refinement of the system based on user input. A system updates stage 246 integrates new data and insights from user feedback, along with the latest repair techniques, into the system. This process ensures that the machine learning models and AR guidance remain accurate and up-to-date, reflecting the latest information available. The updated models and data are then redeployed across the system to enhance future user interactions.

Figure 3:
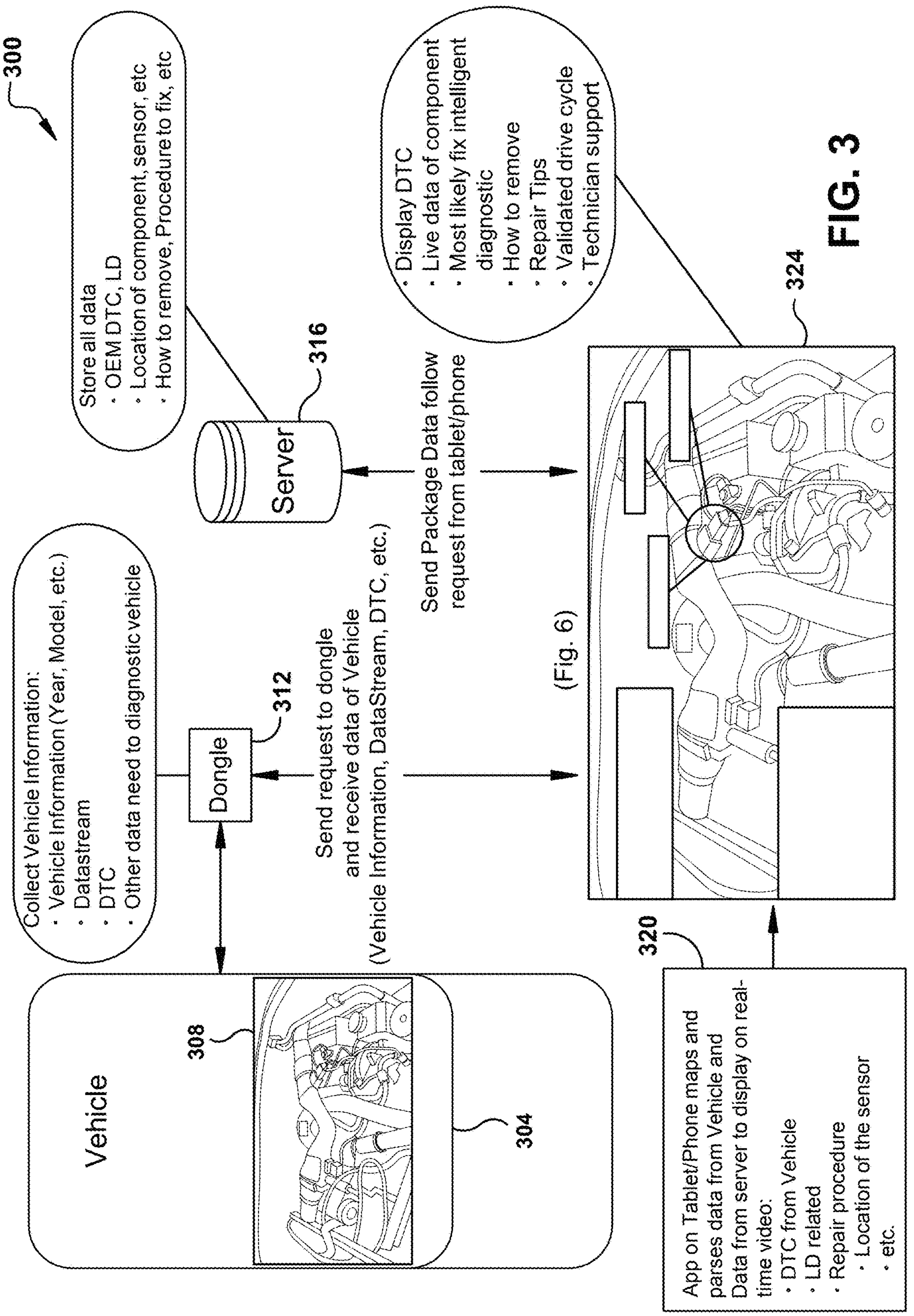
FIG. 3 illustrates a flow diagram of an example embodiment of an augmented reality vehicle diagnostic and repair system with cloud-based guidance.

FIG. 3 illustrates a flow diagram 300 of an example embodiment of an augmented reality vehicle diagnostic and repair system with cloud-based guidance. In the illustrated example, vehicle 304 includes a exteriorly viewable engine area 308. A VCI device, such as dongle 312, collects vehicle information to identify the particular vehicle, as well as streaming data, DTCs, and other data available through the vehicle VCI port. Information from the VCI is suitably transmitted to a data device by one or more of Bluetooth, cellular, Wi-Fi, or a physical USB connection. Gathered information is relayed to server 316, suitably a cloud server such as detailed above. Server 316 includes DTC code information, component location information and repair instructions. An app on a data device 320, such as a smartphone or tablet, functions to generate overlay information with data received from server 316. This suitably includes DTC related information, live data (LD), such as data from sensors, as well as repair procedures. This information provides an AR overlay to an image of engine area 308 in connection with the subject example. Detail relative to the example display on a data device appear below.

Figure 4:
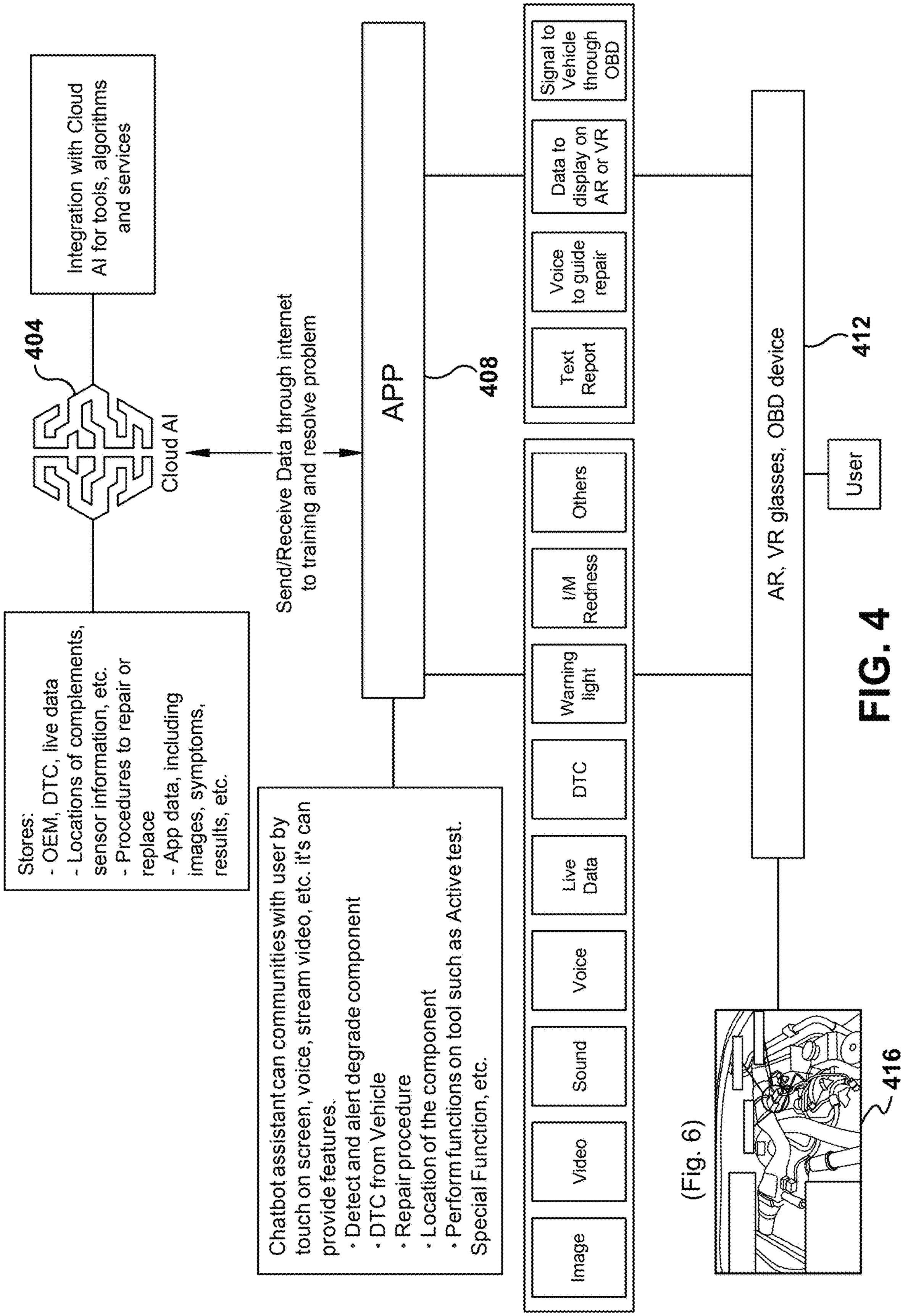
FIG. 4 illustrates a hardware block diagram of an example embodiment of an augmented reality vehicle diagnostic and repair system with cloud-based guidance.

FIG. 4 illustrates a hardware block diagram 400 of an example embodiment of an augmented reality vehicle diagnostic and repair system with cloud-based guidance. Components include a cloud AI server 404, an app 408 on a data device and AR diagnostic hardware 412 that includes an OBD device and an AR device. Various devices are suitably used for AR augmented vehicle diagnostics and repair, each offering unique advantages. Smart glasses and AR headsets, like Microsoft HoloLens, provide hands-free operation, allowing users to see AR overlays directly in their field of view. AR-enabled smartphones and tablets offer a portable solution with the ability to display real-time guidance on-screen as the user points the device at different parts of the vehicle. Wearable cameras and standalone AR-enabled cameras also capture live images, enabling AR overlays on connected displays while keeping the user's hands free. These devices enhance the user's ability to accurately perform diagnostics and repairs by providing dynamic, real-time visual guidance.

Cloud AI server 404 suitably stores OEM DTC and live data information, component locations, sensor information, and overlay information. The server repair or replacement procedures, as well as collected data for AI/ML, suitably undertaken in conjunction with cloud-based tools.

In the context of the AI/ML system for augmented reality (AR) vehicle diagnostics and repair, integrated with a cloud server used in OBD diagnostic systems, platforms like Google Cloud AI Platform, IBM Watson, and Microsoft Azure AI serve as examples of online AI/ML tools augmenting system functionality. For instance, Google Cloud AI Platform is suitably used to develop and train machine learning models that process data from OBD systems, helping to recognize vehicle components and diagnose issues with high accuracy. With Vertex AI, these models are suitably managed and updated continuously, ensuring that the system remains effective as new data is collected.

IBM Watson is suitably used to enhance system natural language understanding and visual recognition capabilities, improving the accuracy of AR overlays and making the repair guidance more user-friendly. Its advanced AI services can also suitably assist in interpreting complex diagnostic codes and converting them into actionable repair steps.

Microsoft Azure AI is another example platform that provides tools like Azure Machine Learning, which is suitably used for predictive analytics, helping to anticipate potential vehicle issues based on trends in OBD data. Additionally, Azure Cognitive Services is suitably used to enhance image recognition and language processing within the AR system, further refining the user experience.

In the example embodiment of FIG. 4, app 408 suitably includes chatbot functionality. An integrated chatbot serves as an AI-driven virtual assistant that interacts with users in real-time, providing guidance and support during vehicle diagnostics and repair. The chatbot can answer questions, explain DTCs, and offer step-by-step instructions, all while seamlessly interacting with the AR system. Chatbot functionality is suitably generated via a cloud server. Example tools like Microsoft Azure Bot Service, IBM Watson Assistant, and Google Dialogflow are suitably used to implement the chatbot, enabling natural language processing and conversational AI to enhance user experience and streamline the repair process.

In the example embodiment of FIG. 4, OBD diagnostic hardware 412 ultimately provides a AR overlay display 416. This is suitably generated on a smartphone display, a tablet display VR glasses, or the like.

Figure 5:
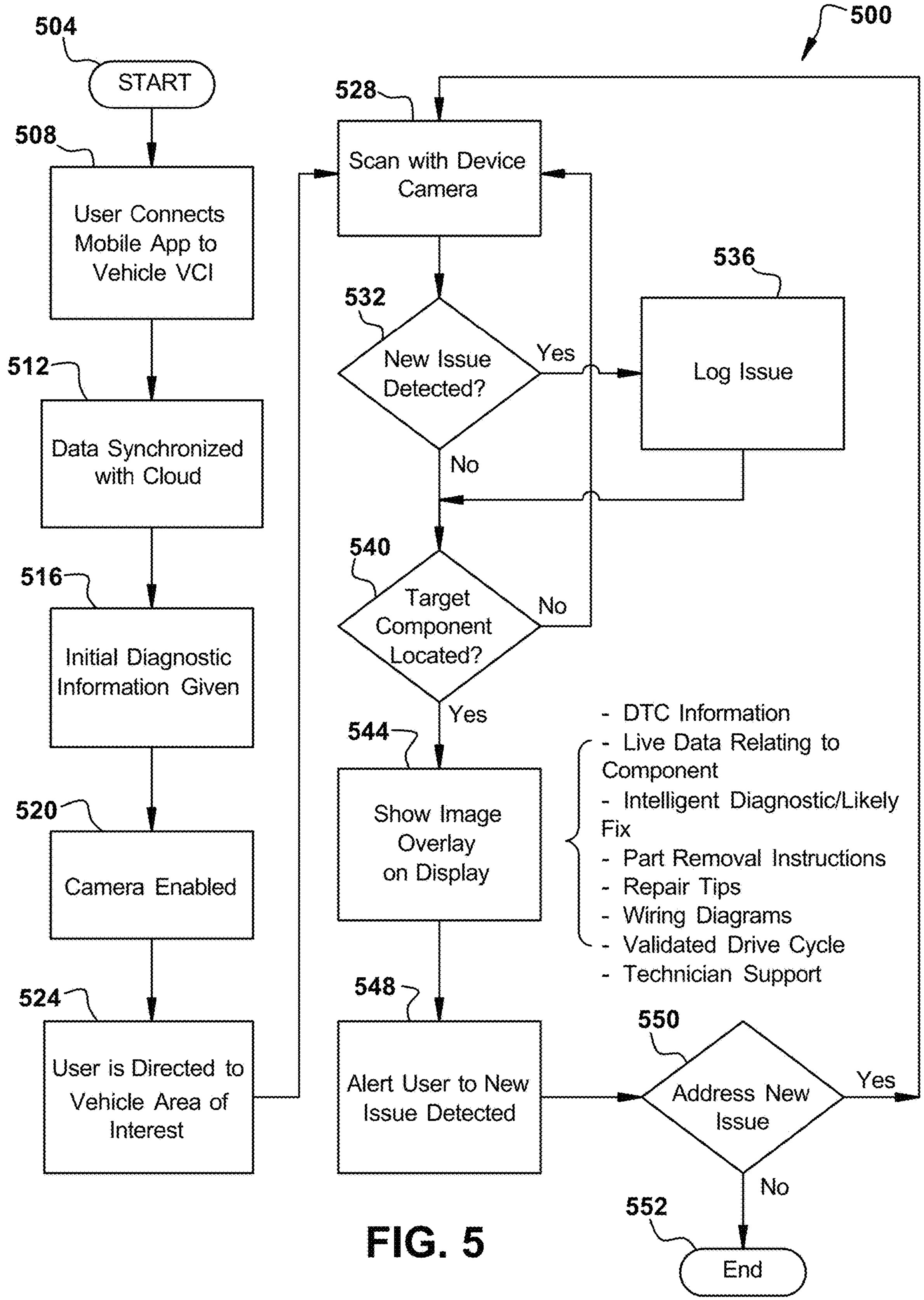
FIG. 5 illustrates a flowchart of an example embodiment of an augmented reality vehicle diagnostic and repair system.

FIG. 5 illustrates a flowchart 500 of an example embodiment of an augmented reality vehicle diagnostic and repair system. The process commences at block 504 and proceeds to block 508 where a user connects a mobile app on their data device to a vehicle VCI, suitably wirelessly with an OBD dongle. Vehicle data, including data such as VIN data, DTC data, sensor data, and the like, are synchronized with a cloud server at block 512. The app, working in conjunction with the cloud server, provides initial diagnostic information at block 516. A user's device camera is enabled at block 520, and the user is directed via display prompts or overlays to a vehicle area of interest at block 524. As the user navigates to the location of interest, the path is scanned at block 528. A test is made at block 532 as to whether any additional areas of concern, or potential concern, were found during the scanning process. If so, any such area is logged at block 536 for future attention. Once any newly detected issue, if present, has been logged, a test is made as to whether the target component has been located at block 540. If not, scanning and navigation is continued at block 528. Once the target location is reached, a real-time image of the area is shown, along with an AR overlay. Example display information includes DTC information, live data, intelligent diagnostics and likely fixes, part removal instructions, repair tips, wiring diagrams, drive cycle validations, technician support, or the like.

When the detected issue has been addressed, the user is alerted to any logged, detected issue at block 540. If the user chooses to address such an issue at block 550, the system returns to block 520 to address it in a similar manner. If no new issue remains or the user decides not to address it at the present time, the process ends at block 552.

Figure 6:
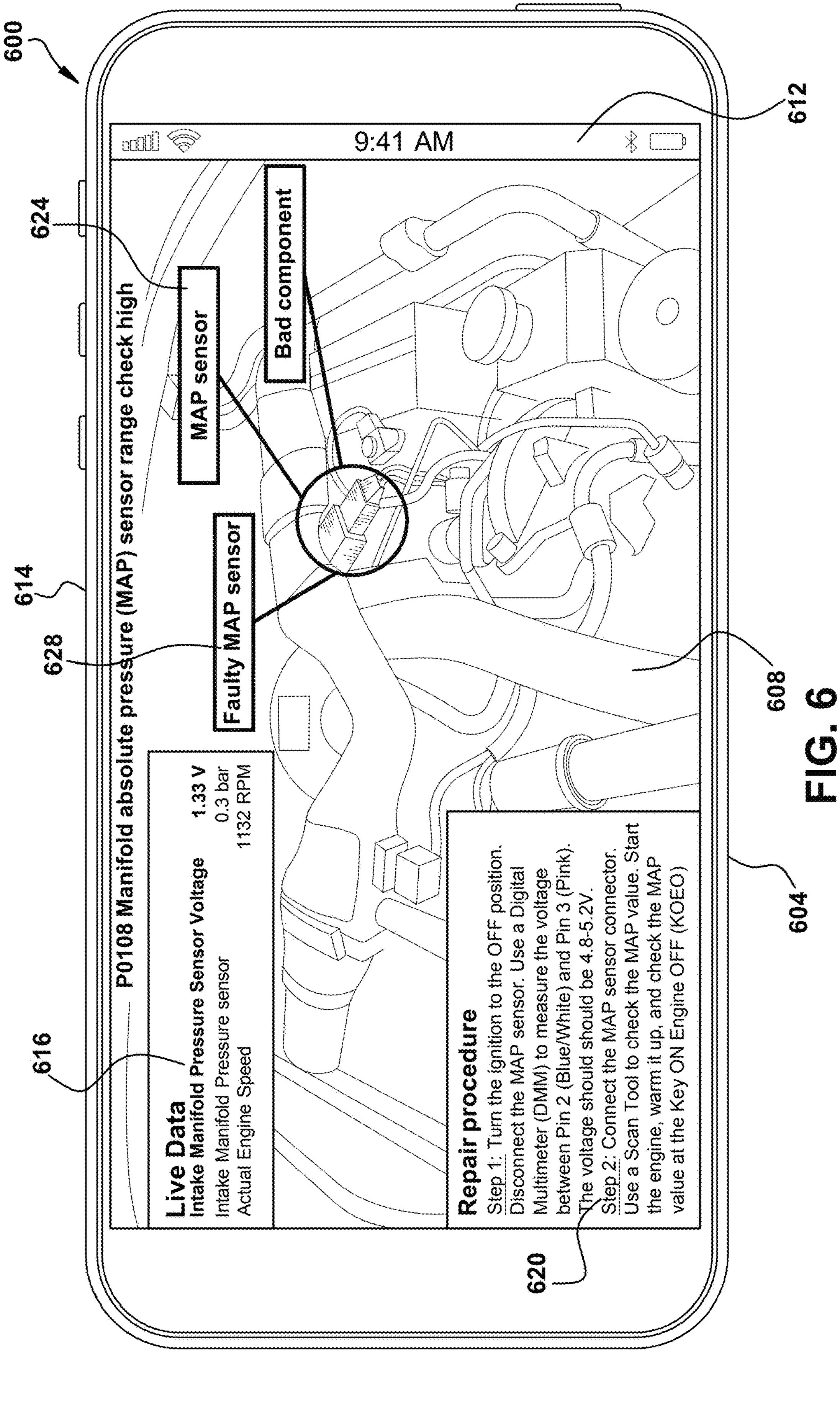
FIG. 6 illustrates an example embodiment of an AR display for an augmented reality vehicle diagnostic and repair system with cloud-based guidance.

FIG. 6 illustrates an example embodiment of an AR display 600 for an augmented reality vehicle diagnostic and repair system with cloud-based guidance includes a digital device comprised of smartphone 604. A real-time image 608 of an area under a vehicle hood is shown on touchscreen 612 showing an indicator 614 relative to a triggering DTC In the illustrated example, DTC P0108 is summarized as manifold absolute pressure (MAP) associated with a sensor check registering high. An AR overlay is superimposed on real-time image 608, and includes a live data section 616, a repair procedure section 620, a component identifier 624 and a faulty part identifier 628.

The particulars shown herein are by way of example only for purposes of illustrative discussion, and are not presented in the cause of providing what is believed to be most useful and readily understood description of the principles and conceptual aspects of the various embodiments of the present disclosure. In this regard, no attempt is made to show any more detail than is necessary for a fundamental understanding of the different features of the various embodiments, the description taken with the drawings making apparent to those skilled in the art how these may be implemented in practice.

What is claimed is:

1. An apparatus for enhanced vehicle diagnostics and repair using augmented reality, comprising:

a vehicle communication interface (VCI) configured to receive diagnostic data from a vehicle onboard diagnostic (OBD) system of a vehicle, the diagnostic data including diagnostic trouble code (DTC) data and live data;

one or more processors and associated memory configured to transmit the diagnostic data with vehicle identification data identifying the vehicle to a cloud server;

the cloud server configured to receive and process the diagnostic data and the vehicle identification data to provide vehicle-specific component-location data and repair-procedure data;

a mobile device in communication with the cloud server, wherein the mobile device is equipped with an augmented reality (AR) module configured to overlay diagnostic information, repair instructions, and live data corresponding to processed diagnostic data onto real-time images of the vehicle captured by the camera of the mobile device;

a user interface on the mobile device that provides interactive guidance for diagnosing and repairing vehicle components based on the AR overlays;

wherein at least one of the cloud server, the mobile device, or a combination thereof is configured to cause the mobile device to present AR guidance on the display, the AR guidance directing a user toward a target component associated with the diagnostic data before the target component is located in the real-time images;

wherein at least one of the cloud server, the mobile device, or the combination thereof is further configured to map the diagnostic data and the vehicle-specific component-location data to the real-time images captured by the camera to locate the target component in the real-time images; and wherein the AR module is configured to generate an AR overlay anchored to the located target component, the AR overlay configured to present a component identifier, a fault identifier associated with the DTC data, live data relating to the located target component, and repair-procedure information for the located target component.

2. The apparatus for enhanced vehicle diagnostics and repair using augmented reality of claim 1 wherein the VCI is operatively connected to the mobile device via a wireless communication protocol comprising one or more of Bluetooth, cellular, Wi-Fi, or a physical USB connection.

3. The apparatus for enhanced vehicle diagnostics and repair using augmented reality of claim 1 wherein the cloud server further comprises a natural language processing module configured to interpret user queries related to vehicle diagnostics and repair and generate corresponding responses that are presented within the AR module on the mobile device.

4. The apparatus for enhanced vehicle diagnostics and repair using augmented reality of claim 1 further comprising a chatbot integrated within the user interface of the mobile device, the chatbot being configured to provide real-time assistance by responding to user inquiries about DTCs and associated repair procedures in accordance with data processed on the cloud server.

5. The apparatus for enhanced vehicle diagnostics and repair using augmented reality of claim 1 wherein machine learning models on the cloud server are trained using historical and real-time VCI output data to recognize specific vehicle components, predict potential issues, and optimize repair instructions presented via the AR module.

6. The apparatus for enhanced vehicle diagnostics and repair using augmented reality of claim 5 wherein:

the user interface on the mobile device is further configured to allow the user to submit feedback on the diagnostic and repair process; and wherein the feedback is transmitted to the cloud server for use in refining the machine learning models and enhancing future diagnostic accuracy.

7. The apparatus for enhanced vehicle diagnostics and repair using augmented reality of claim 1 wherein:

the AR module is further configured to detect and tag secondary vehicle issues identified from the real-time images captured by the camera while AR guidance is being presented to direct the user toward the target component, each secondary vehicle issue being unique to an issue associated with the target component; and tagged issues are stored for deferred attention and subsequent user notification.

8. A method for enhanced vehicle diagnostics and repair using augmented reality comprising:

retrieving diagnostic data from a vehicle's onboard systems via a vehicle communication interface (VCI), the diagnostic data including diagnostic trouble codes (DTCs) and live data;

transmitting the diagnostic data with vehicle identification data identifying the vehicle to a cloud server;

processing the diagnostic data on the cloud server to provide vehicle-specific component location data and repair procedure data;

transmitting the processed data to a mobile device equipped with an augmented reality (AR) module;

presenting AR guidance on a user interface display of the mobile device, the AR guidance directing a user toward a target component with real-time images captured by a mobile device camera before the target component is located in the real-time images;

overlaying diagnostic information, repair instructions, and live data corresponding to processed data onto real-time images of the vehicle captured by the mobile device's camera when the target component is located; and providing interactive guidance through the user interface for diagnosing and repairing vehicle components based on the AR overlays.

9. The method for enhanced vehicle diagnostics and repair using augmented reality of claim 8 further comprising establishing a wireless connection between the VCI and the mobile device using a communication protocol comprising one or more of Bluetooth, cellular, Wi-Fi, or a physical USB connection.

10. The method for enhanced vehicle diagnostics and repair using augmented reality of claim 8 further comprising:

interpreting user queries related to vehicle diagnostics and repair through a natural language processing module on the cloud server; and generating corresponding responses that are presented within the AR module on the mobile device.

11. The method for enhanced vehicle diagnostics and repair using augmented reality of claim 8 further comprising:

providing real-time assistance through a chatbot integrated within the user interface of the mobile device; and wherein the chatbot responds to user inquiries about diagnostic trouble codes (DTCs) and associated repair procedures based on data processed on the cloud server.

12. The method for enhanced vehicle diagnostics and repair using augmented reality of claim 8 further comprising:

training machine learning models on the cloud server using historical and real-time VCI output data to recognize specific vehicle components;

predicting potential issues; and optimizing repair instructions presented via the AR module.

13. The method for enhanced vehicle diagnostics and repair using augmented reality of claim 12, further comprising the steps of:

collecting user feedback on the diagnostic and repair process through the user interface of the mobile device;

transmitting the feedback to the cloud server; and refining the machine learning models based on the feedback to enhance future diagnostic accuracy.

14. The method for enhanced vehicle diagnostics and repair using augmented reality of claim 8, further comprising:

detecting and tagging secondary vehicle issues identified during the diagnostic or repair process;

storing the tagged issues; and notifying the user for future reference and action.

15. A computer program comprising one or more non-transitory program storage media on which are stored instructions executable by a processor or programmable circuit to perform operations for providing enhanced vehicle diagnostics and repair using augmented reality, the operations comprising:

retrieving diagnostic data from a vehicle's onboard systems via a vehicle communication interface (VCI), the diagnostic data including diagnostic trouble codes and live data;

transmitting the diagnostic data with vehicle identification data identifying the vehicle to a cloud server for processing;

receiving processed data from the cloud server to an augmented reality (AR) module, the processed data including vehicle-specific component location data and repair procedure data;

presenting AR guidance on a display of the mobile device, the AR guidance directing a user toward a target component, with real time images captured by a camera of the mobile device before the target component is located in the real-time images;

overlaying diagnostic data information, repair instructions and live data corresponding to the processed data onto the real-time images of the vehicle when the target component is located; and providing interactive guidance through a user interface for diagnosing and repairing vehicle components using overlays of the diagnostic data information, repair instructions or live data.

16. The computer program to perform operations for providing enhanced vehicle diagnostics and repair using augmented reality of claim 15, the operations further comprising establishing a wireless connection with the VCI using a communication protocol comprising one or more of Bluetooth, cellular Wi-Fi, or a physical USB connection.

17. The computer program to perform operations for providing enhanced vehicle diagnostics and repair using augmented reality of claim 15, the operations further comprising:

interpreting user queries related to vehicle diagnostics and repair through a natural language processing module on the cloud server; and generating corresponding responses that are presented within the AR module.

18. The computer program to perform operations for providing enhanced vehicle diagnostics and repair using augmented reality of claim 15, the operations further comprising:

providing real-time assistance through a chatbot integrated within the user interface; and wherein the chatbot responds to user inquiries about diagnostic trouble codes (DTCs) and associated repair procedures based on data processed on the cloud server.

19. The computer program to perform operations for providing enhanced vehicle diagnostics and repair using augmented reality of claim 15, the operations further comprising:

collecting user feedback on the diagnostic and repair process through the user interface; and transmitting the feedback to the cloud server.

20. The computer program to perform operations for providing enhanced vehicle diagnostics and repair using augmented reality of claim 15, the operations further comprising:

detecting and tagging secondary vehicle issues identified during the diagnostic or repair process;

storing the tagged issues; and notifying the user for future reference and action.

* * * * *